V. W. PAGÉ.
COASTER BRAKE.
APPLICATION FILED OCT. 8, 1912.

1,212,669.

Patented Jan. 16, 1917.
2 SHEETS—SHEET 2.

WITNESSES:

INVENTOR:
Victor W. Pagé,
BY
his ATTORNEY.

UNITED STATES PATENT OFFICE.

VICTOR W. PAGÉ, OF BRISTOL, CONNECTICUT, ASSIGNOR TO THE NEW DEPARTURE MANUFACTURING COMPANY, OF HARTFORD, CONNECTICUT, A CORPORATION OF CONNECTICUT.

COASTER-BRAKE.

1,212,669.   Specification of Letters Patent.   Patented Jan. 16, 1917.

Application filed October 8, 1912. Serial No. 724,532.

*To all whom it may concern:*

Be it known that I, VICTOR W. PAGÉ, a citizen of the United States, residing at Bristol, county of Hartford, State of Connecticut, have invented a certain new and useful Coaster-Brake, of which the following is a full, clear, and exact description, such as will enable others skilled in the art to which it appertains to make and use the same, reference being had to the accompanying drawings, forming part of this specification.

My invention relates to coaster brakes and more particularly to braking mechanisms adapted to be used in such structures.

One object of the present invention is to provide a structure having simple and efficient means for applying the braking force to the brake.

Another object is to provide a device in which the brake and the brake-actuating means are at opposite sides, axially, of a bearing for the hub shell and yet such bearing is of a character to efficiently support the loads to which it is subjected.

Another object is to provide a device having an efficient and simple structure for carrying upon the axle the means connecting the brake and the brake-actuating means.

To these ends and also to improve generally upon devices of the character indicated, my invention consists in the various matters hereinafter described and claimed.

Figure 1:
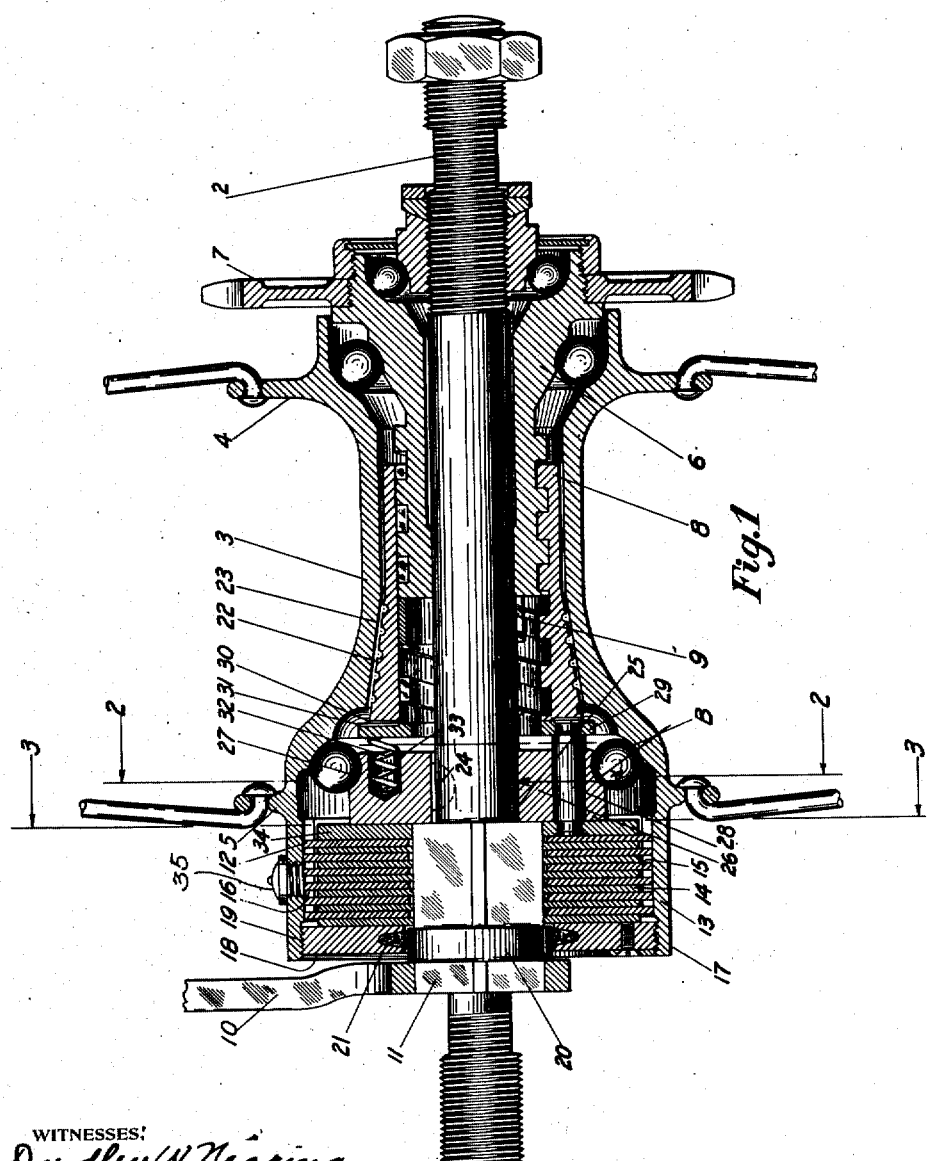
Figure 2:
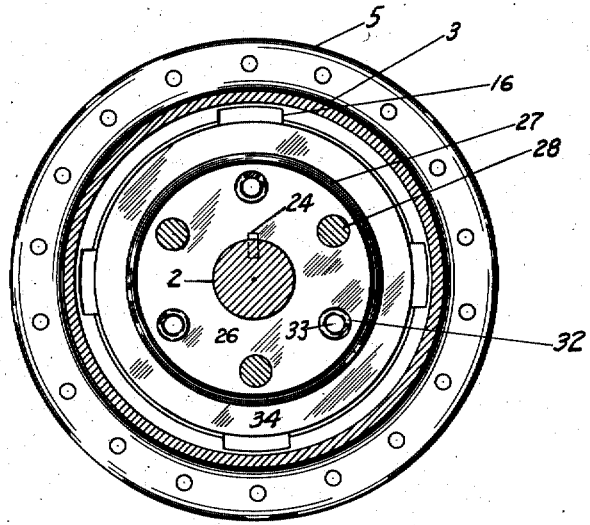
Figure 3:
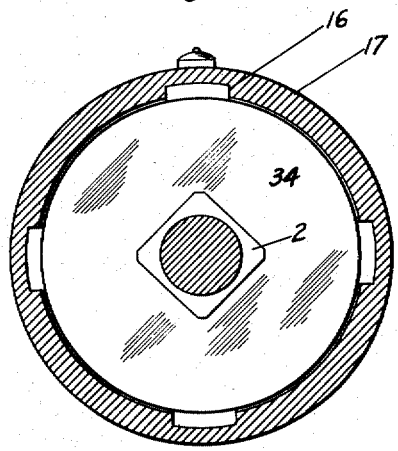

In the accompanying drawings: Figure 1 is a longitudinal diametrical section of a coaster brake embodying my invention. Fig. 2 is a section substantially on line 2—2 of Fig. 1, but with the balls removed; and Fig. 3 is a section on line 3—3 of Fig. 1.

Although in no wise limited to such application, I herein disclose my invention as applied to the general type of coasting and braking hub having a laterally shiftable connector sleeve and disclosed in Patent No. 745,524, granted December 1, 1903, to Albert F. Rockwell.

Referring more particularly to the present drawings and to said patent, 2 indicates the axle of the rear wheel which commonly embodies the coaster brake, said axle being adapted to be secured to the frame of a bicycle or the like, 3 is the hub of such rear wheel, said hub having the usual spoke flanges 4 and 5, 6 is the threaded driver sleeve rotatably mounted on said axle and carrying the usual sprocket wheel 7, all, as thus far described, substantially as disclosed in said patent to Rockwell.

A connector, shown as a laterally shiftable sleeve 8, provided with interior threads which coact with the threads upon said driver sleeve, is provided. Such connector, when moved in one direction acts to drive and, when shifted in the other direction actuates the brake.

Suitable means for retarding the rotation of the connector 8 may be provided, such means being shown as the friction spring 9 sprung about the axle 2 and engaging the inner surface of the connector. In addition to the means for holding the axle in the frame of the bicycle, such as the usual nuts, provision is made for holding the axle from rotation, such, for example, as the torque or anchor arm 10 fitted over the squared end of the axle, as indicated at 11, and attached to the bicycle.

Suitable braking means are provided, there being shown an interior brake 12 of the friction-disk type. The brake is shown as housed within the end of the hub 3, such end being designated generally as 13, and therefore easily accessible for assembling, adjustment, etc. Certain of the disks, as 14, are slidably but nonrotatably attached to the axle 2, as by squaring the axle, and the intermediate disks, as 15, are shown as slidably and nonrotatably attached to the hub 3 by keying at 16. These brake disks are illustrated as housed and protected by the cylindrical housing 17 forming a part of the hub-end designated generally as 13, such housing being here shown as a mere extension of the hub. Removable protecting means for the brake and closing means for the hub are preferably provided, such means being shown as a disk 18 removably attached, as by the threads 19, to the hub and rotatable about the circular flange 20 on the axle. Suitable packing, as 21, to retain oil within the housing may be provided if desired, such oil being conveniently supplied by way of the oil-cap 35.

The structure just described provides a brake whose members are fully protected when assembled, and such structure permits the brake parts to be readily and inexpensively assembled, and through the simple removal of the end plate 18, also renders them easy of access, as for repair, without disturbing the interior mechanism or adjustment of the remainder of the hub.

Assuming that the laterally shiftable connector 8 is so related to the brake that lateral shifting of the connector to the left (in Fig. 1) causes the brake to be actuated, it will be apparent that, when the sprocket wheel 7 is driven forwardly by ordinary forward pedaling, it rotates said driver sleeve forwardly and thus causes said connector to travel to the right (on the threads of the driver sleeve) until its clutch face 22 engages the corresponding clutch face 23 of the hub, whereupon continued forward rotation of the sprocket, the sleeve and the connector, causes the hub 3 to rotate and the bicycle to be propelled; when the rider holds his feet stationary on the pedals, and thus holds the driver sleeve 6 stationary, the rotating hub causes the connector 8 to move to the left (on the threads of the driver sleeve) until the before mentioned clutching engagement is broken, whereupon the hub 3 is free to coast; and when the driver sleeve is rocked backwardly, as by backward rocking of the pedals, said connector 8 is shifted to the left until, by the connection to the brake, hereinafter described, the brake is actuated, and further backward rocking increases the force applied to the brake.

In the herein illustrated embodiment of my invention a suitable and preferable connection is provided for transmitting the braking force from the connector to the brake. Mounted upon the axle 2 and fast therewith, as by the key 24, and preferably strongly held thereon against longitudinal shifting, as by a shoulder portion 25 of the axle, is a supporting and guiding means shown as a collar 26. This collar 26 is spaced longitudinally of the axle from both the brake 12 and the connector 8, as clearly indicated in Fig. 1, and is conveniently formed with a ball race 27 for balls B on which rests the hub 3.

The collar 26 carries connecting means projecting from each end thereof and shown as pins 28, preferably three in number, which may, as shown in Fig. 2, be arranged at angles of 120° with respect to each other and equally spaced from the center of the collar 26. These pins traverse the collar 26 substantially in the direction of its length and are slidable through, and with respect to, the said collar.

Carried upon, and supported by, the pins 28 at their ends toward the connector 8 may be provided a contact means, shown as a ring or annulus 29. Such annulus is preferably normally positioned in close proximity to the end of the connector 8 and spaced therefrom, but is capable of being engaged by the connector 8 when the same travels sufficiently to the left. The cooperating surfaces of the annulus and connector may be suitably roughened, as by corrugating, as indicated at 30, 31.

For positively, but yieldingly, forcing the pins 28 away from the brake, and the annulus 29 toward the connector, suitable means may be provided such for example as the springs 32, preferably three in number, spaced at 120°, lying intermediate and equally spaced from pins 28, and spaced from the center of the collar 26 as are the pins 28. These springs are shown as resting in recesses 33 in the collar 26 and as pressing against the ring 29.

In connection with the annulus 29, preferably by being connected with the pins 28 at their ends opposite to those attached to the annulus, may be provided a means for applying the braking force directly to the brake 12. Such means is shown as a disk 34 non-rotatably and slidably mounted upon the axle, as by squaring the axle, and having an engaging surface approximately co-extensive with that of the friction disk of the brake which it is adapted to engage. Evidently the parts designated as 29, 28 and 34 may be considered as constituting a laterally shiftable connecting means between the connector 8 and the brake 12 and serving to transmit the braking force from one side of the bearing to the other.

Normally the disk 34 is out of braking engagement with the friction disk with which it coöperates by direct engagement. It will be seen that since the contact areas of the disk 34, and its coöperating friction disk, and the areas of all the respective friction disks are approximately co-extensive, the braking force is applied to each disk over substantially its entire area.

It will also be seen that, when the brake is applied, the reaction thrust is transmitted through plate 18 and taken up by the strongly braced abutment 26 and by the large bearing B.

In operation, movement of the connector 8 to the left brings it into contact with the annulus 29, the corrugations 30, 31, serving to make this contact positive and to insure against undesirable angular movement of said connector; continued lateral movement of the connector 8 forces the ring or annulus 29 and pins 28 and disk 34 to the left, against the tension of springs 32, and forces the brake disks into contact with each other and the outermost disk into contact with the part 18 carried by the hub, the reaction thrust being taken up by the strong abutment 26, as above described; and, upon discontinuance of the braking force by the connector 8, the parts 34, 28 and 29 are positively forced to the right by the springs 32 and the braking action is relieved.

It will be noted that the collar 26 is of such width and character that it presents a substantially solid mass of material throughout its circumferential length and along the radial-component-load lines, as x Fig. 1, of the bearing between the face directly supporting the load of the hub shell and the portions resting on the axle. The result is that, in a device of the present character and in which the bearing at the "brake end" is stationary on the axle and the braking force is transferred from one side of the bearing to the other, the hub shell is strongly and rigidly supported under the radial components of the loads transmitted to it from the spokes. It will also be noted that a single means—the collar 26—supports the hub shell, the springs 32, and the pins 28 with their connected annulus 29. This arrangement is conducive to simplicity of structure and ease of assembly.

Having thus described my invention, what I claim as new and desire to secure by Letters Patent is—

1. In a braking mechanism, an axle, a part rotatable thereabout, a brake for said part, means for actuating the brake, means for connecting said brake and actuating means, means for normally holding said connecting means in position to release said brake, and common means for supporting said connecting means and said holding means, and for supporting said part upon said axle; substantially as described.

2. In a cycle hub provided with a brake, an axle, a bearing carried by said axle and stationary thereon, a spoke-carrying-wheel-hub shell directly carried by said bearing for rotation about said axle; said shell being adapted to sustain the loads transmitted by said spokes, and certain of said bearing's load lines, radial to the axle and extending thereto from portions of said bearing immediately sustaining said loads, being coincident with certain of the bearing points of said bearing upon said axle, and the bearing providing supporting material continuous along such lines; a braking means for said shell upon the one side of said bearing, a brake operating means upon the other side of said bearing, at least one of said means being received within said shell, and means for operatively connecting said operating means and said braking means, such connecting means extending from one side of said bearing to the other; substantially as described.

3. In a coaster brake, an axle, a bearing carried by said axle and stationary thereon, a spoke-carrying-wheel-hub-shell directly carried by said bearing for rotation about said axle; said shell being adapted to sustain the loads transmitted by said spokes, and certain of said bearing's load lines, radial to the axle and extending thereto from portions of said bearing immediately sustaining said loads, being coincident with certain of the bearing points of said bearing upon said axle, and the bearing providing supporting material continuous along such lines; a braking means for said shell upon the one side of said bearing, a brake operating means upon the other side of said bearing, means for operatively connecting said operating means and said braking means, such connecting means extending from one side of the bearing to the other, a driver for said shell carried by said axle for rotation independently of said shell, and means whereby when said driver rotates in the one direction it drives the shell, when said shell overruns the driver said shell is free to coast and when said driver rotates in the other direction it operates the brake operating means to thereby apply the braking means to said shell; substantially as described.

4. In a cycle hub, an axle, a bearing carried by said axle, a spoke-carrying hub shell carried by said bearing for rotation about said axle, said bearing providing supporting material along certain of the radial load lines of said bearing and extending from the parts of the bearing directly supporting the load of said shell to parts of the bearing adjacent the axle, a brake for said shell at the one side of the bearing, an actuating means for said brake at the other side of the bearing, and means for connecting said actuating means and said brake and comprising a pin slidably carried in the said material of the bearing and operatively connected at its opposite ends with said actuating means and said brake; substantially as described.

5. In a cycle hub, an axle, a bearing comprising a substantially solid portion carried by said axle, a spoke-carrying hub shell carried by said bearing for rotation about said axle, said bearing portion extending throughout its circumferential length in a substantially solid mass substantially radially from said axle to the face supporting said shell, a brake for said shell at the one side of said bearing, an actuating means for said brake at the other side of said bearing, and means for connecting said actuating means and said brake and comprising a pin slidably carried in said bearing portion and operatively connected at its opposite ends with said actuating means and said brake; substantially as described.

6. In a cycle hub, an axle, a bearing carried by said axle, a spoke-carrying hub shell carried by said bearing for rotation about said axle, a brake for said shell at the one side of said bearing and having portions lying at a substantial radial distance beyond said axle and adapted to receive the braking force, an actuating means for said brake at the other side of said bearing and having portions lying at a substantial radial distance beyond said axle and adapted to apply the braking force, and means for connecting said brake and said actuating means and carried by the bearing at a substantial radial distance beyond said axle; substantially as described.

7. In a coaster brake, an axle, a bearing carried by said axle, a spoke-carrying hub shell carried by said bearing for rotation about said axle, a brake for said shell at the one side of said bearing and having portions lying at a substantial radial distance beyond said axle and adapted to receive the braking force, an actuating means for said brake at the other side of said bearing and having portions lying at a substantial radial distance beyond said axle and adapted to apply the braking force, means for connecting said brake and said actuating means and carried at a substantial radial distance beyond said axle, a driver for said shell carried by said axle for rotation independently of said shell, and means whereby when said driver rotates in the one direction it drives the shell, when said shell overruns the driver said shell is free to coast, and when said driver is turned in the other direction it operates the brake actuating means to thereby apply the brake to said shell; substantially as described.

8. In a cycle hub, an axle, a radially extending bearing member carried by said axle and provided with a socket, a hub shell carried by said bearing member for rotation about said axle, a brake for said shell, a shiftable mechanism adjacent said bearing member for actuating said brake and which when shifted in one direction applies said brake and when shifted in the other direction releases said brake, means received in said socket and operatively connected with said shiftable mechanism to move such mechanism in one direction of its shifting movement, and means for shifting said mechanism; substantially as described.

9. In a cycle hub, an axle, a radially extending bearing member carried by said axle and provided with a socket, a hub shell carried by said bearing member for rotation about said axle, a brake for said shell, a shiftable mechanism adjacent said bearing member for actuating said brake and which when shifted in one direction applies said brake and when shifted in the other direction releases said brake, means received in said socket and operatively connected with said shiftable mechanism to move such mechanism in the direction to release said brake, and means for shifting said mechanism; substantially as described.

In testimony whereof, I hereunto affix my signature, in the presence of two witnesses.

VICTOR W. PAGÉ.

Witnesses:
M. B. THORPE,
VERNER A. GREENE.

It is hereby certified that the residence of the assignee in Letters Patent No. 1,212,669, granted January 16, 1917, upon the application of Victor W. Page, of Bristol, Connecticut, for an improvement in "Coaster-Brakes," was erroneously written and printed "Hartford, Connecticut," whereas said assignee's residence, as shown by the records of assignments in this office, is *Bristol, Connecticut;* and that the said Letters Patent should be read with this correction therein that the same may conform to the record of the case in the Patent Office.

Signed and sealed this 6th day of March, A. D., 1917.

[SEAL.]

F. W. H. CLAY,
*Acting Commissioner of Patents.*

Cl. 208—57.